US012583682B2

(12) United States Patent
Frangeul et al.

(10) Patent No.: US 12,583,682 B2
(45) Date of Patent: Mar. 24, 2026

(54) CONVEYOR ARRANGEMENT

(71) Applicant: INTERROLL HOLDING AG, Sant'Antonino (CH)

(72) Inventors: Xavier Frangeul, La Roche-sur-Yon (FR); Antoine Loizeau, La Roche-sur-yon (FR)

(73) Assignee: INTERROLL HOLDING AG, Sant'antonino (CH)

( * ) Notice: Subject to any disclaimer, the term of this patent is extended or adjusted under 35 U.S.C. 154(b) by 147 days.

(21) Appl. No.: 18/685,395

(22) PCT Filed: Sep. 5, 2022

(86) PCT No.: PCT/EP2022/074553
§ 371 (c)(1),
(2) Date: Feb. 21, 2024

(87) PCT Pub. No.: WO2023/036722
PCT Pub. Date: Mar. 16, 2023

(65) Prior Publication Data
US 2024/0391699 A1 Nov. 28, 2024

(30) Foreign Application Priority Data
Sep. 7, 2021 (EP) .................................... 21195336

(51) Int. Cl.
*B65G 13/06* (2006.01)
*B65G 43/08* (2006.01)

(52) U.S. Cl.
CPC ............. *B65G 13/06* (2013.01); *B65G 43/08* (2013.01); *B65G 2201/0267* (2013.01); *B65G 2203/0208* (2013.01)

(58) Field of Classification Search
CPC ............................... B65G 13/06; B65G 43/08; B65G 2201/0267; B65G 2203/0208
(Continued)

(56) References Cited

U.S. PATENT DOCUMENTS

| | | | | |
|---|---|---|---|---|
| 5,443,584 A | * | 8/1995 | Diefendahl | ........... E01D 15/127 |
| | | | | 14/2.4 |
| 11,926,478 B1 | * | 3/2024 | Frangeul | ................ B65G 67/24 |

(Continued)

FOREIGN PATENT DOCUMENTS

| | | | |
|---|---|---|---|
| EP | 3539904 A1 | | 3/2018 |
| EP | 3792206 A1 | | 3/2021 |
| MY | 201784 A | * | 3/2024 |

OTHER PUBLICATIONS

PCT/EP2022/074553 Written Opinion mailed Mar. 16, 2023.

*Primary Examiner* — Gene O Crawford
*Assistant Examiner* — Lester Rushin, III
(74) *Attorney, Agent, or Firm* — Biotech Beach Law PC; Raymond Wagenknecht

(57) ABSTRACT

Conveyor arrangement (1), comprising a conveying section (11) having a plurality of rollers (22) on which a conveyable object (9), in particular a pallet, can be conveyed, a mobile drive (30), wherein the mobile drive is movable along different positions along the conveying section (11) and the mobile drive is adapted to temporarily provide a drive power to a selected roller (22) depending on the position of the mobile drive (30) in particular by immediate contact between the mobile drive and the roller (22); wherein that the mobile drive (30) comprises scanners (40) to detect a presence of an conveyable object (9) located above the rollers (22).

12 Claims, 16 Drawing Sheets

(58) Field of Classification Search
USPC .......................................................... 193/35
See application file for complete search history.

(56) References Cited

U.S. PATENT DOCUMENTS

| 12,391,294 B2* | 8/2025 | Smith | ....................... B62B 3/02 |
| 2017/0080886 A1 | 3/2017 | Kuga et al. | |
| 2019/0276238 A1* | 9/2019 | Dudek | ................... B65G 13/06 |

* cited by examiner

P

9M

P

9M

| 40Ga | d1 | d2 | d3 | d4 |
|------|----|----|----|----|
| 40a  |    | x  |    |    |
| 40b  |    | x  |    |    |
| 40c  | x  |    |    |    |
| 40d  | x  |    |    |    |

| 40Gb | d1 | d2 | d3 | d4 |
|------|----|----|----|----|
| 40a  | x  |    |    |    |
| 40b  | x  |    |    |    |
| 40c  |    |    |    | x  |
| 40d  |    |    |    | x  |

| 40Ga | d1 | d2 | d3 | d4 |
|---|---|---|---|---|
| 40a |  | x |  |  |
| 40b | x |  |  |  |
| 40c | x |  |  |  |
| 40d |  | x |  |  |

| 40Gb | d1 | d2 | d3 | d4 |
|---|---|---|---|---|
| 40a |  | x |  |  |
| 40b | x |  |  |  |
| 40c | x |  |  |  |
| 40d |  | x |  |  |

40Ga →

| | d1 | d2 | d3 | d4 |
|---|---|---|---|---|
| 40a | | | | x |
| 40b | x | | | |
| 40c | x | | | |
| 40d | | x | | |

40Gb →

| | d1 | d2 | d3 | d4 |
|---|---|---|---|---|
| 40a | | x | | |
| 40b | x | | | |
| 40c | x | | | |
| 40d | | x | | |

| ID | 11..19 | x |
|---|---|---|
| 9a | 11 | 2 |
| 9b | 11 | 7 |
| 9c | 12 | 7 |
| 9d | 16 | 3 |
| 9e | 14 | 8 |
| 9f | 15 | 2 |

CONVEYOR ARRANGEMENT

CROSS REFERENCE TO RELATED APPLICATIONS

This is a US national phase application under 35 USC § 371 of international patent application no. PCT/EP2022/074553, filed Sep. 5, 2022, which claims priority to European patent application no. 21195336.9, filed Sep. 7, 2021; the entire content of each is herein incorporated by reference.

TECHNICAL FIELD

The invention refers to a conveyor arrangement.

BACKGROUND OF THE INVENTION

US 2019/0276238 A1, also published as EP 3 539 904 A1, discloses a mobile drive for driving rollers in a roller conveyor. The mobile drive comprises a main body, a first drive motor to drive the mobile drive between different positions along the conveyor and a roller driving device mounted to the chassis frame. A conveyor drive is attached to an upper side of the main body. The conveyor drive is adapted to be mechanically coupled to one or a plurality of rollers of the roller conveyor. A second drive motor of the mobile drive provides drive power for the conveyor drive and consequently provides the drive power to the rollers of the roller conveyor. The conveyor drive can get into direct contact of the rollers so as to bring the rollers in rotational movement. The mobile drive is moving synchronously with a pallet to be conveyed along the direction of travel. The mobile drive is powered by a battery located within the mobile drive. So there is no need for complex wiring along all the entire roller conveyor.

WO 2021/048042 A2, also published as EP 3 792 206 A1, discloses a further development of the arrangement described above. Here several sensors are provided. The mobile drive (robot) has front end sensors and rear end sensors covering a space in driving direction before and behind the robot and a space above the rollers. Since the sensors are located below the rollers and directed in direction of travel, the sensors can merely scan an area through gaps between the rollers. In case the rollers are very close to each other, the field of view in forward or rearward direction is very limited. The area straight above the robot is viewed vertically from below the rollers through the gaps between the rollers.

SUMMARY OF THE INVENTION

It is the object of the invention to provide an improved conveyor arrangement.

The invention comprises a conveyor arrangement and a method according to the main claims; embodiments are subject of the subclaims and the description.

The invention is based on the assumption that the larger the scan area, the greater the accuracy of the scan and thus the higher the quality of the results is. The area that is captured by the pallet itself is decisive for the quality. The detection of the rollers themselves is of less importance for the quality.

In an embodiment, to gain a large scan area of the rollers, the fields of view of the scanners are oriented in parallel to the axis of the rollers when viewed in top view. When viewed in frontal view the fields of view of the scanners are oriented angled with respect to the horizontal plane and to the vertical plane.

In particular the rollers are oriented horizontally. The rollers are oriented perpendicular to the direction of travel.

The conveyor arrangement is adapted to convey objects having a weight of at least 100 kg, in particular 500 kg, in particular at least 1000 kg. The object may comprise a pallet and/or a container.

BRIEF DESCRIPTION OF THE DRAWINGS

The invention is described in more detail with the help of the figures; herein shows FIG. 1 schematically an inventive conveyor arrangement in side view.

DETAILED DESCRIPTION OF THE INVENTION

Figure 1:
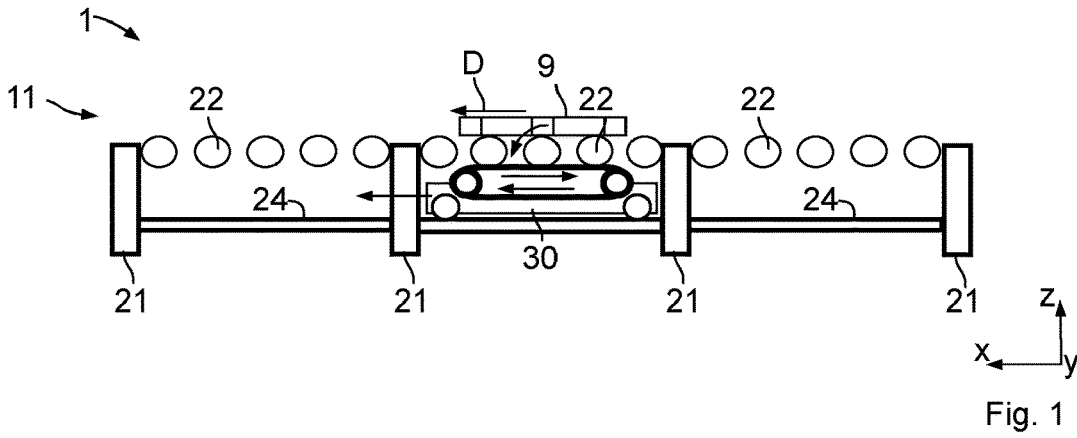

FIGS. 1, 2, 6 and 7 show parts of an inventive conveyor arrangement 1. The conveyor arrangement 1 is adapted to convey objects 9, in particular comprising a pallet and/or a container. The conveyor arrangement 1 is adapted to move the object 9 along a conveying section 11 in a predefined direction D of travel. The conveyor arrangement 1 may comprise a plurality of conveying sections, as described later. The conveyor arrangement 1 comprises a plurality of rollers 22 arranged along the direction D of travel. The rollers 22 are supported on a frame 21.

Within the conveying section 11 the rollers 22 are idler rollers, which are not driven by a dedicated stationary drive motor. Instead the rollers 22 are in temporary drive connection with a mobile drive 30. The mobile drive 30 is adapted to be moved between different positions of the conveying arrangement 1. Depending on the position of the mobile drive 30, said mobile drive 30 can drive at least one of the rollers 22 which are located above the mobile drive 30. If one of the rollers is driven by the mobile drive, an conveyable object on top of the rollers is driven as well.

Figure 2:
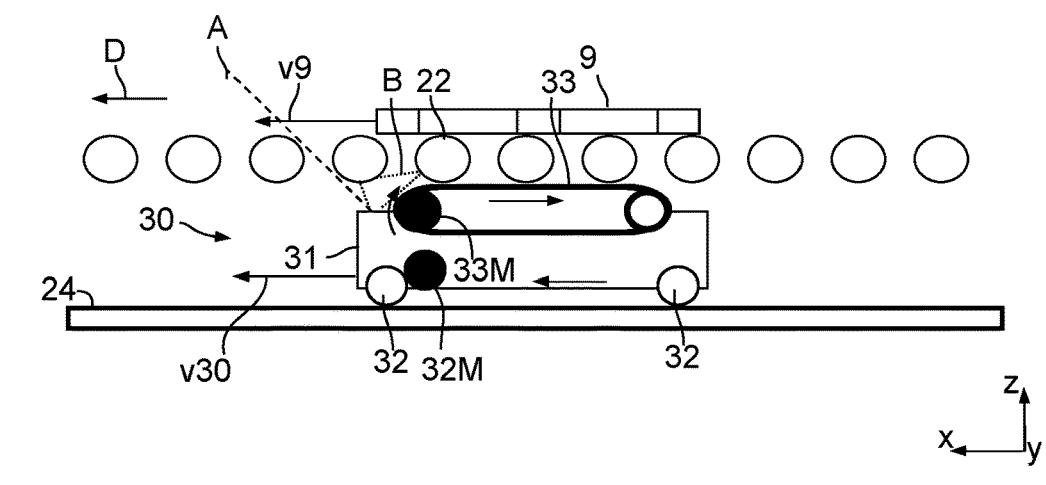
FIG. 2 the arrangement of FIG. 1 in more detail in side view.
Figure 4:
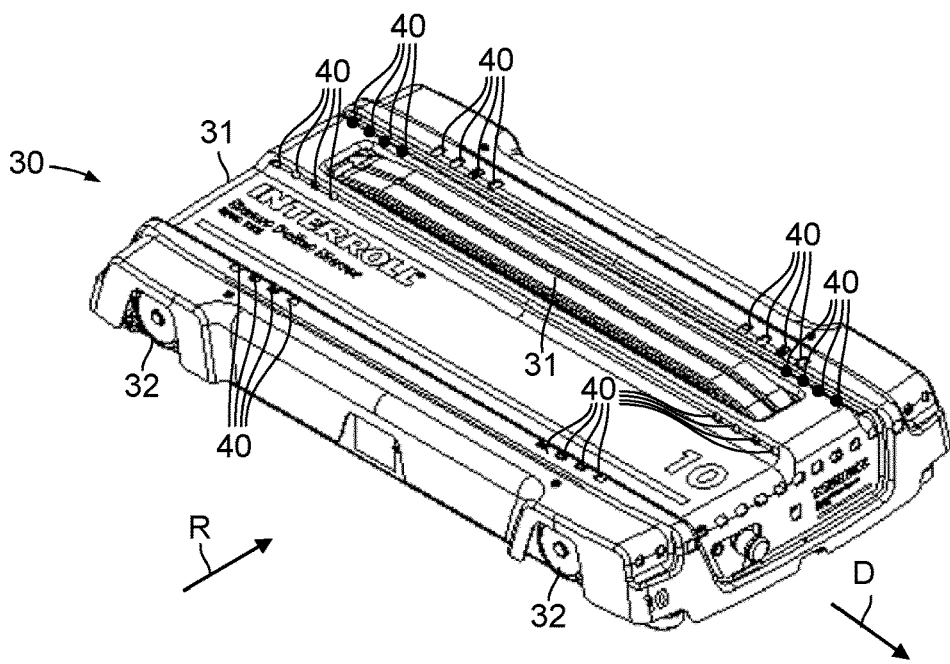
FIG. 4 a mobile drive of the arrangement of FIG. 1 in perspective view.

FIGS. 2 and 4 show the mobile drive 30 in more detail. The mobile drive 30 has a main body 31. The main body is supported by wheels 32. The wheels allow the main body 31 to be movable along a track 24 parallel to the direction D of travel in a conveying section. A first drive motor 32M provides drive power resulting in a drive motion of the main body 31 along the track 24. In particular the drive power is provided to at least one of the wheels 32. Power from the first drive motors 32M leads to a movement of the mobile drive 30 with a speed v30 in drive direction D.

The first motor 32M can also provide a brake force enabling the main body 31 to remain stationary even if externally urged along the track 24. Alternatively or combination the mobile drive 30 can have a parking brake.

The mobile drive has a conveyor drive 33. The conveyor drive is adapted to provide the rollers 22 with a drive power. The drive power is transmitted by a temporary drive connection to a number of the rollers 22, in particular by a temporary frictional connection. The conveyor drive 33 in particular comprises a drive belt, which is in temporary frictional engagement with one or more rollers 22. The conveyor drive 33 has a second drive motor 33M.

During conveying an object 9 along the conveying section 11, the mobile drive 30 is driving synchronously with the object 9 along the conveyor section, so that the mobile drive 30 is always located below the object 9. A number of said rollers 22 are located between the mobile drive 30 and the object 9. Thereby the conveyor drive 33 drives said rollers 22 (e.g. in an anti-clockwise direction), leading to a movement of the object 9 (e.g. in leftward direction) with a speed v9 (FIG. 2).

Figure 3:
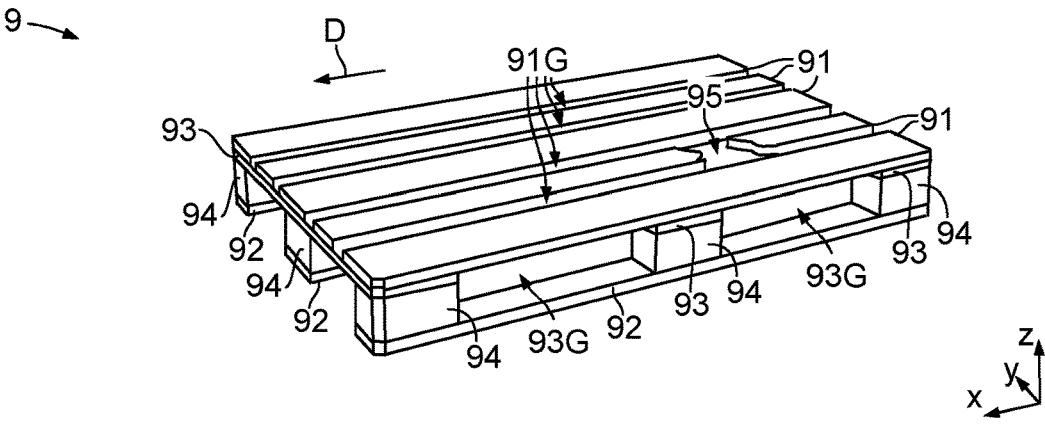
FIG. 3 a pallet to be conveyed by the arrangement of FIG. 1 in perspective view.

The object to be conveyed may be a pallet 9 as shown in FIG. 3. A usual pallet 9 comprises upper longitudinal members 91, on which an additional load (not shown) may be placed. The pallet comprises lower longitudinal members 92, which are in contact with the rollers 22. Between the lower longitudinal members 92 and the upper longitudinal members 91 distance blocks 94 are positioned. Cross members 93 below the upper longitudinal members 91 connect the longitudinal members 91, 92, in particular together with the blocks 94, to each other.

The upper and lower longitudinal members 91, 92 are located parallel to each other and directed in travel direction D defined by the conveying section 11 (FIG. 1). The cross members 93 are located parallel to each other and directed perpendicular to the direction of travel D. Longitudinal gaps 91G are provided between the upper longitudinal members 91. Cross gaps 93G are provided between the cross members 93.

The mobile drive 30 comprises several scanners 40 to detect the presence of the object to be conveyed above the rollers 22.

Scanning the area above the rollers 22 with a scanner located below the rollers is subject to a number of technical challenges.

Challenge A. The dotted line A in FIG. 2 shows a possible field of view A of a scanner (not shown), which is in side view angled and in top view directed in direction of travel D (as disclosed in WO 2021/0848042 A1, FIGS. 2 and 3). This scanner could detect an object in front or rear of the mobile drive 30. Depending on the size of the rollers, the distance between two rollers and the angle of the field of view, merely a small gap remains for scanning the area above the roller from below the rollers. So looking "through" the virtual plane of the rollers from below leaves merely a small window of view.

Challenge B. The rollers are made from metal, in particular having a reflective surface. So reflections B (FIG. 2) at the rollers may distort the scan results.

Challenge C. In most applications the object 9 may comprise a pallet, located on top of the rollers 22. Pallets are made from wood and are subject to extensive wear. After a certain time of usage the surfaces of the pallet gets damaged and may comprise cracks 95 (FIG. 3). Consequently each pallet has an individual reflection pattern.

Cracks 95 and gaps 91G constitute areas of the pallet, which cannot be detected by vertical scanning (as proposed in WO 2021/0848042 A1). In case the scanner scans vertically in an area of a crack 95 or a gap 91G, a pallet may not be detected. The pallet may be located on the conveying section more leftwards or more rightwards, so the position of the gaps 91G may vary during use. Based on merely small scan areas it is not possible by the known methods to detect the presence of a pallet reliably. Even if the presence of a pallet is detected, it is impossible by the known methods to detect the exact position of the pallet related to the mobile drive.

Figure 5:
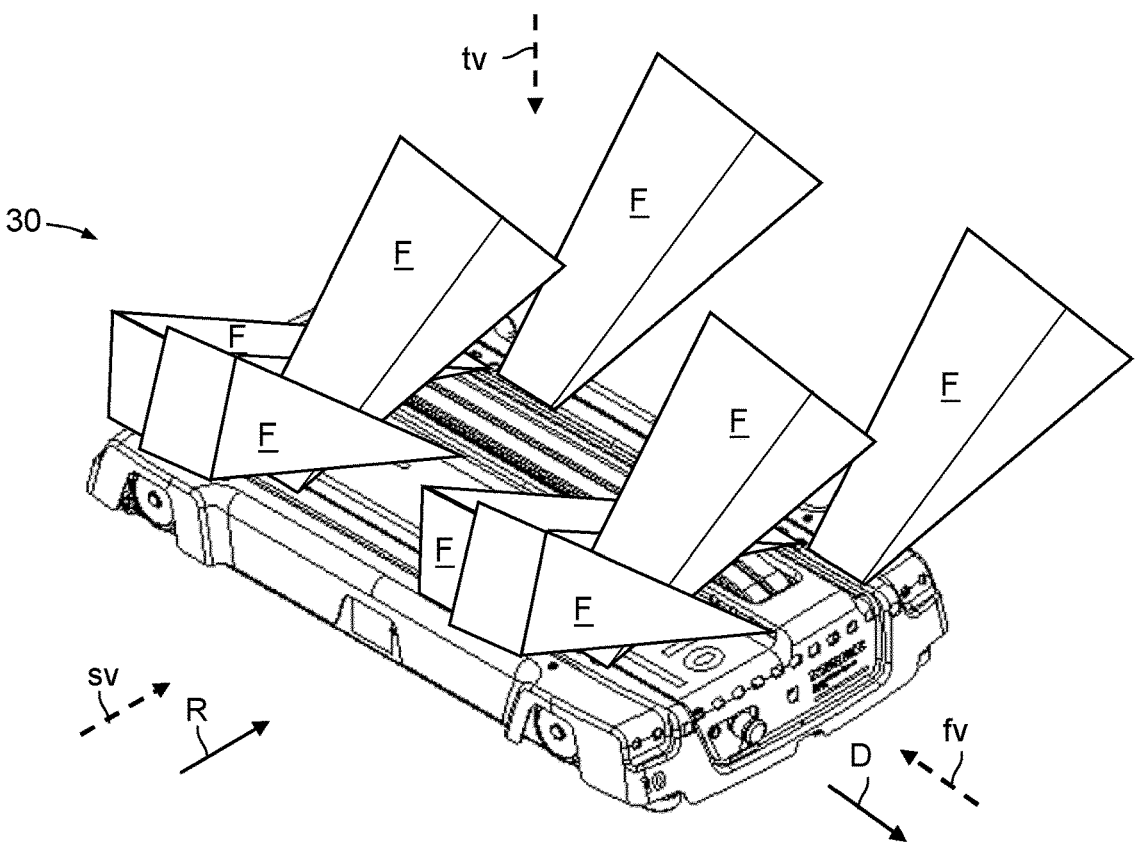
FIG. 5 the mobile drive of FIG. 4 along with scan areas of scanners in perspective view.

FIG. 4 shows a mobile drive 30 of the inventive conveyor arrangement 1. On top of the mobile drive, several scanners 40 are provided. The scanners 40 are adapted to detect any items above the mobile drive 30. In principle the item can be an object to be conveyed 9 and stationary components within the conveying section 11, in particular parts of the rollers 22 and the frame 21. The scanners 40 are located in a manner, so that a field of view F (FIGS. 5 to 7) is oriented perpendicular to the direction of travel D and consequently parallel to the orientation R of the rollers 22 (in top view). The orientation R of the rollers 22 is defined by an axis of rotation of the rollers.

Figure 6:
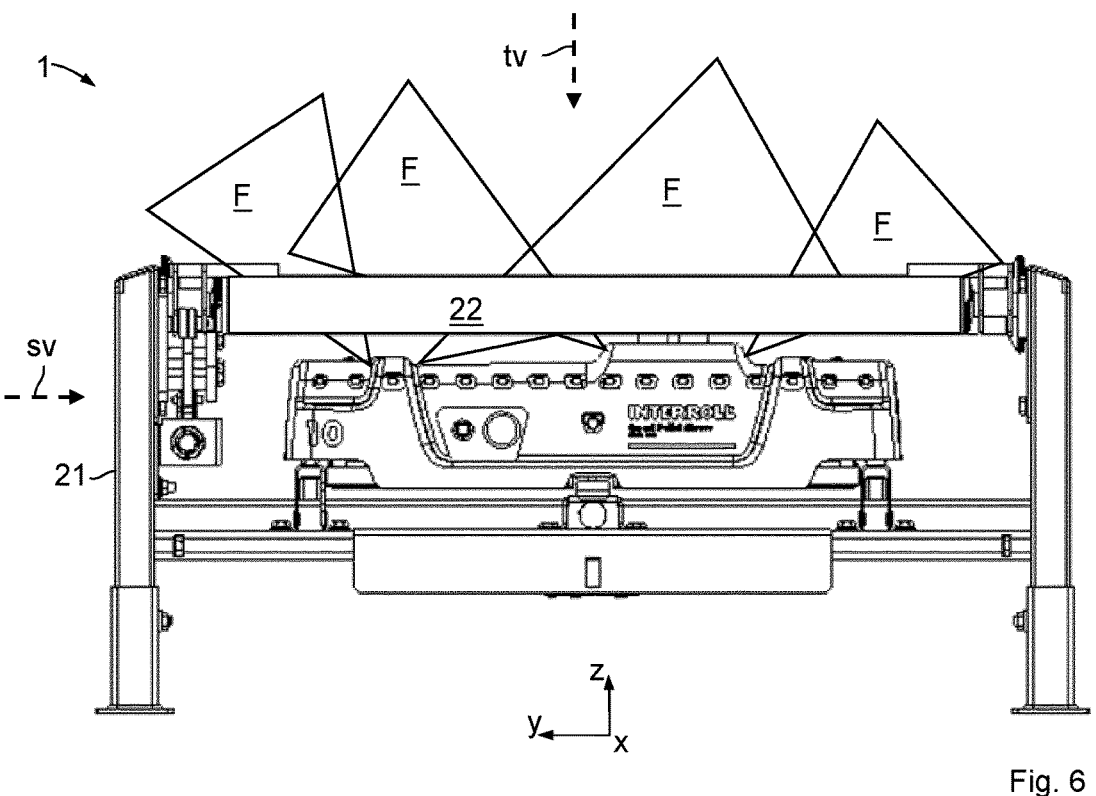
FIG. 6 the arrangement of FIG. 1 in frontal view with scan areas.
Figure 7:
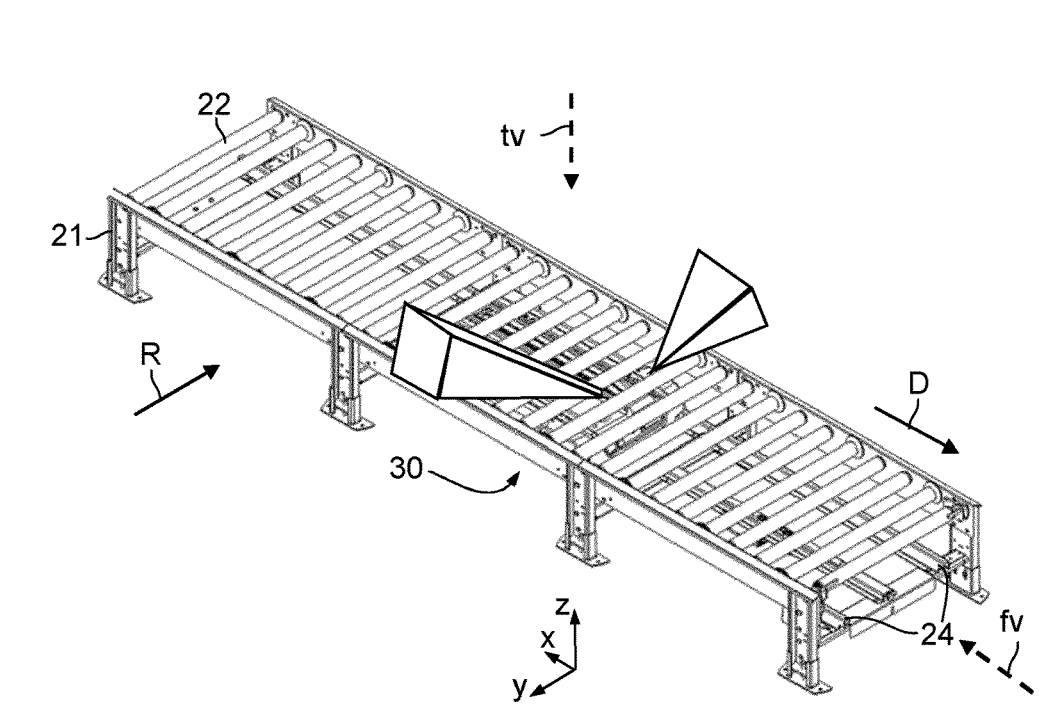
FIG. 7 the arrangement of FIG. 1 in frontal view with a selection of scan areas.

When viewed in frontal view, the field of view F of the scanner 40 is angled upwards at an acute angle (FIG. 6).

The term "scanner" is to be understood broadly. A scanner is not necessarily a single device which itself can provide a detailed picture image of the objects located in the field of view. A scanner may be a component which is able to detect distances between the scanner and an object located in the field of view. Such scanners are widely used as ultrasonic sensors in the field of park distance controls for cars. The field of view may be a one to three dimensional area, in particular a straight line (1D), a (flat) triangle (2D) or a cone (3D). A group of scanners may be used to provide a more dimensional image of the area above the mobile drive.

Consequently the scanners are adapted to precisely scan through the area between the rollers 22 and to have an expanded view on the object to be conveyed above the rollers.

Figure 8:
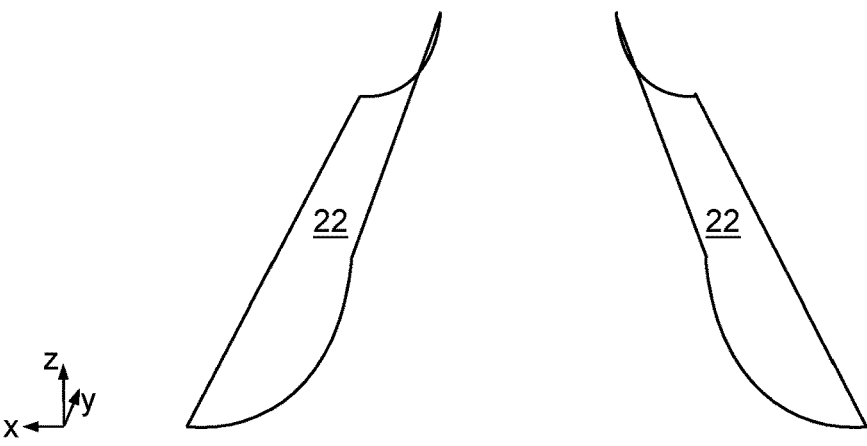
FIG. 8 schematically partial surfaces of rollers detectable by the scanners.

FIG. 8 shows, what can be seen by the scanner 40, if no object is present on top of the roller. Here a cylindric section of the surface of the rollers 22 facing the scanners are detected by the scanners.

Figure 9:
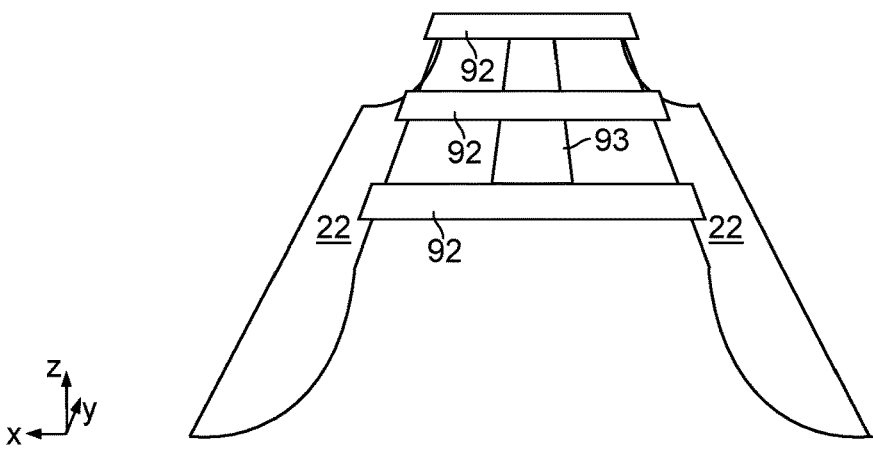
FIG. 9 schematically and additionally to FIG. 8 partial surfaces of lower longitudinal members and a cross member of the pallet detectable by the scanners.
Figure 10:
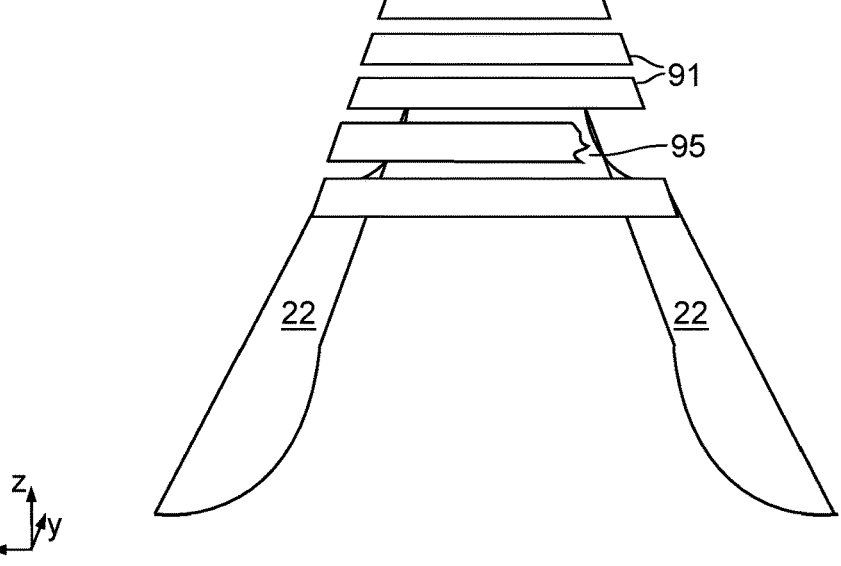
FIG. 10 schematically and additionally to FIG. 8 partial surfaces of upper longitudinal members of the pallet detectable by the scanners.

In case a pallet 9 is located on top of the roller within the field of view, the scanner 40 can detect the lower surfaces of the lower longitudinal member 92 as well as the lower surface of the cross member 93 (FIG. 9). Also the scanner can detect at least parts of the upper longitudinal beam 91, which are separately shown in FIG. 10 (FIGS. 9 and 10 are split merely for purpose of better understanding; in fact the elements of both figures will overlap each other which would lead to a complex and undescriptive figure).

The scanner may be a LIDAR, which creates a digital point cloud of the surfaces above the rollers.

Figure 11:
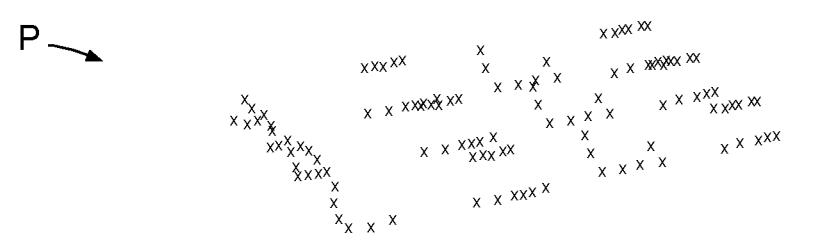
FIG. 11 a representation of a digital point cloud obtained by LIDAR scanner.
Figure 11:
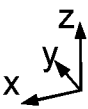

After filtering out the surfaces of the roller, a point cloud P remains as shown in FIG. 11. The point cloud P does not represent the complete lower surface of the pallet 9, since parts of the pallet 9 are obstructed by the rollers 22 or are not within the field of view of the scanners at all.

Figure 12:
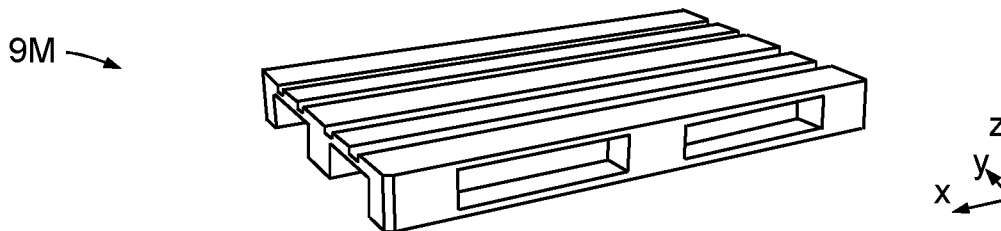
FIG. 12 a representation of a digital pallet model.

For positioning a pallet within the coordinate system of the conveying section, a simplified digital surface model 9M of a pallet 9, shown in FIG. 12, may be used.

Figure 13:
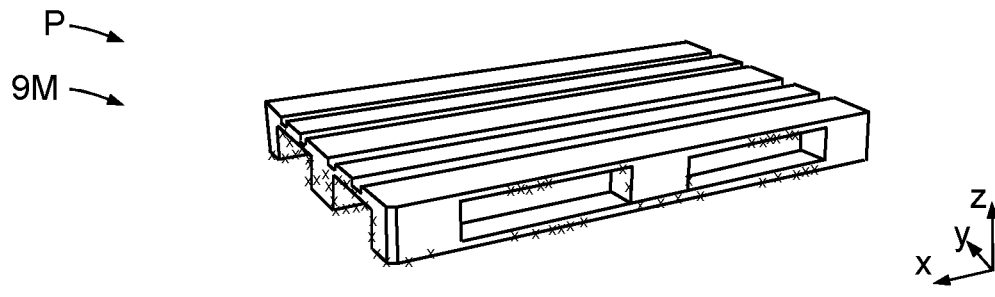
FIG. 13 a representation of the point cloud matched with the digital pallet model.

The surface model 9M is brought into alignment with the captured point cloud P (FIG. 13), so that the position of the pallet can be determined. Such matching technologies are known from other technological fields (e.g. WO 2020/7065093 A1, FIGS. 4-7 and linked description).

Figure 14:
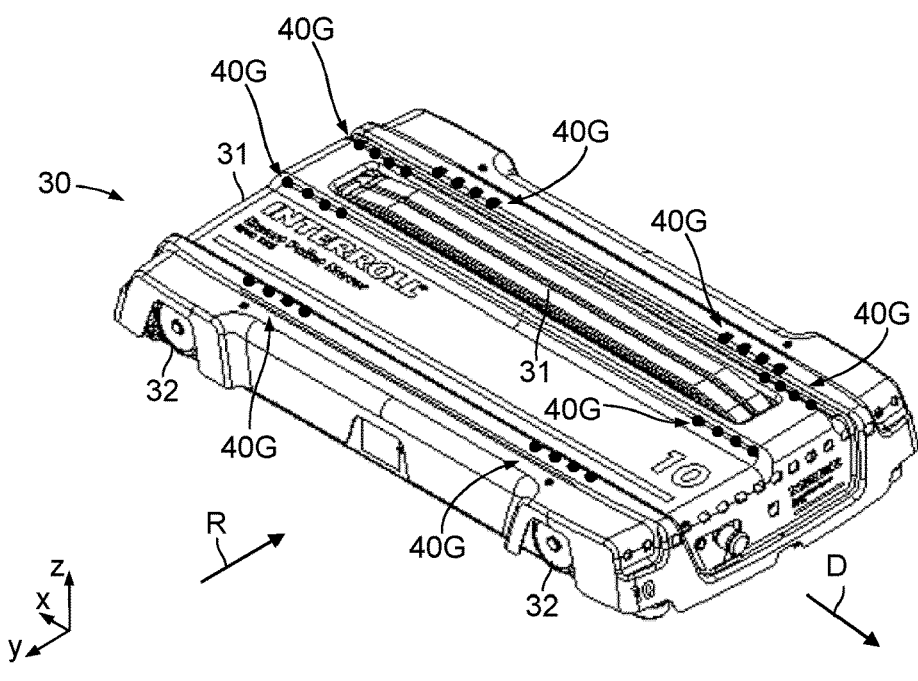
FIG. 14 the mobile drive of FIG. 4.

FIG. 14 shows again the mobile drive 30 of FIG. 4. Here the scanners 40 are grouped in scanner groups 40G. Each group comprises a plurality of scanners, e.g. four scanners 40a, 40b, 40c, 40d.

Each scanner 40 has its own field of view F. In front view (FIG. 15) the field of view F has the shape of a triangle which is oriented angled to the vertical and horizontal to best cover the lower side of the pallet (as described previously). In side view the field of view F is merely a flat area covering only some millimeters in x direction, adapted to scan an area which is perpendicular to the direction of travel/parallel to the orientation of the rollers 22 (see subsequently in FIGS. 17 to 19).

Figure 16:
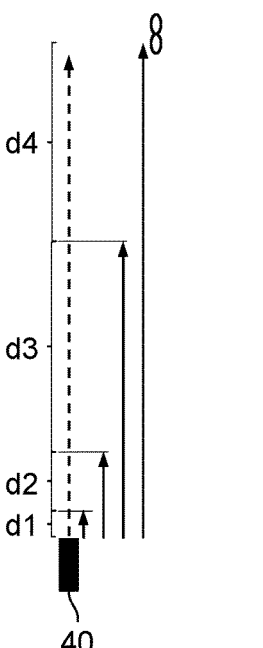
FIG. 16 schematically the sensors at the mobile drive of FIG. 14 along with scanning ranges in direction of view.

With reference to FIG. 16, each scanner 40 is adapted to measure a distance between the scanner and the nearest surface of any object in the field of view. Here the scanner is a simple scanner which can detect the distance to a most close surface. Such distance measurement sensors are know from park assistance systems in cars, in particular based in ultrasonic. The measured distances are classified into distance classes d1 to d4. Here no point cloud is obtained.

Distance class d1 represents a distance, in which the roller 22 is expected.

Distance class d2 represents a distance, in which a surface of the pallet on top of the roller is to expected.

Distance class d3 represents a distance, which is too far away for a pallet surface, and consequently without relevance for the pallet detection. For example a ceiling of a factory hall is within distance class d3.

Distance class d4 is the infinite distance; meaning that no reflection will be received by the scanner at all. Distance classes d3 and d4 are a clear indication that no surface of a pallet is detectable on top of the roller in the x-position of the respective scanner.

Figure 15:
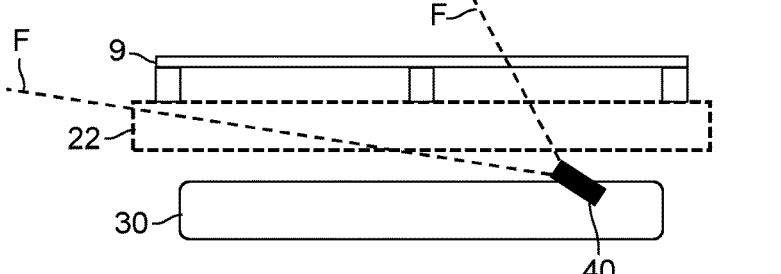
FIG. 15 the orientation of the sensors at the mobile drive of FIG. 14 in context of the rollers and pallet in front view.
Figure 17:
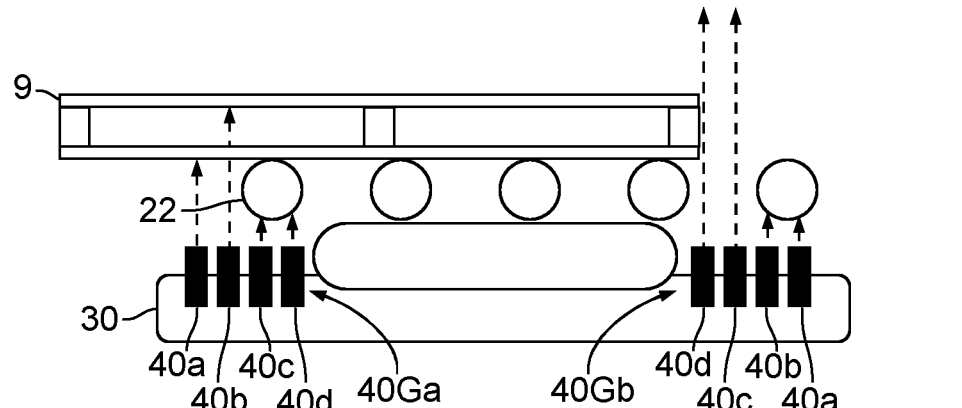
FIG. 17 schematically the mobile drive during positioning the mobile drive below a pallet in side view.
Figure 18:
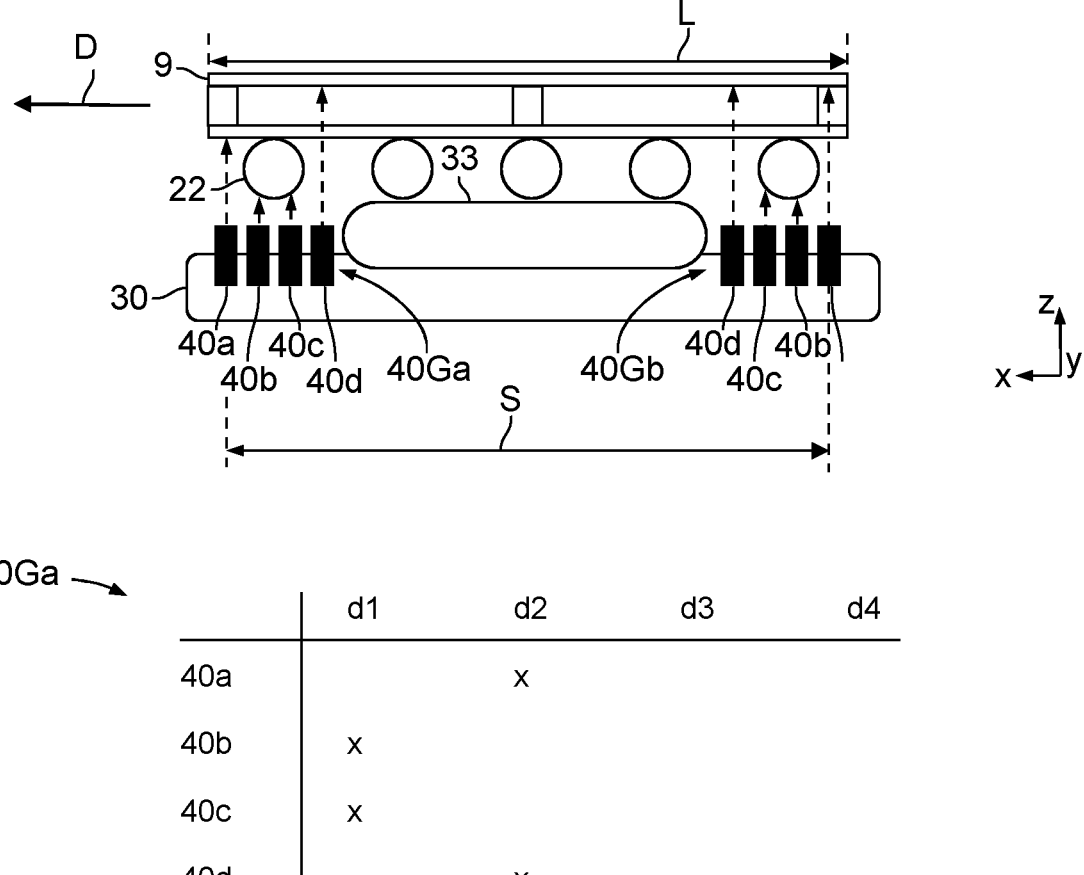
FIG. 18 schematically the mobile drive positioned below a pallet in side view.
Figure 19:
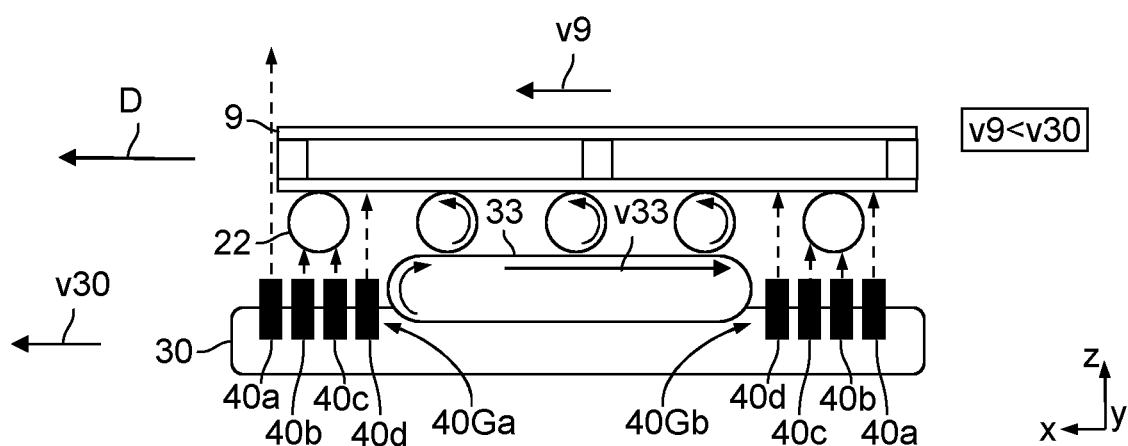
FIG. 19 schematically the mobile drive during a conveying operation of the pallet located above the mobile drive in side view.

FIGS. 17 to 19 show the mobile drive 30 along with the rollers 22 and a pallet 9 on top of the rollers 22 in side view in different situations. In fact the scanners are depicted with a vertical field of view; however the field of view is angled as shown in frontal view (FIG. 15). Here is an example of two scanner groups 40Ga, 40Gb each having four scanners 40a-d. The scanners 40a-d scan the area above the scanners in side view in a flat manner, so that each scanner merely can detect surfaces of objects which are located in the same x-position (deviations of some millimeters are allowed).

The tables in FIGS. 17 to 19 show the allocation of the scanning results of each individual scanner 40 to the distance classes.

FIG. 17 shows a situation where the mobile drive 30 is searching for the position of the pallet. Here a first scanner group 40Ga is located below the pallet. The first and second scanners 40a,b detect surfaces in the second distance class d2; the third and the fourth scanner 40 c,d detect surfaces in the first distance class d1. Consequently, the first scanner group 40Ga is located below a roller 22 and below a pallet 9. To detect a pallet 9 a sensor can detect either any surface the upper members 91, 93 (e.g. sensor 40b of G40a) or lower beams 92 (e.g. sensor 40a of G40a).

A second scanner group 40Gb is fully located outside of the pallet 9. The third and fourth scanners 40c,d detect surfaces in the fourth distance class d4 (in particular also comprising the case, that no surface is detected at all due to infinite distance to the next surface); the first and the second scanner 40a,b detect surfaces in the first distance class d1. Consequently, the first scanner group is located below a roller but not under a pallet.

A front end or rear end position cannot be detected isolated from this scanning result in this situation.

FIG. 18 shows a situation where the mobile drive 30 is centrally located under the pallet 9. Here the first scanner group 40Ga and the second scanner group 40Gb are located below the pallet 9. The first and forth scanners 40a,d detect surfaces in the second distance class d2; the third and the fourth scanner 40c,d detect surfaces in the first distance class d1. Consequently, the first scanner group 40Ga is located centrally below a roller and under a pallet. Same applies for scanners of scanner group 40Gb.

A front end or rear end position are not explicitly detected. A scanning range S in the direction of travel D (x-direction) is smaller than the overall length L of the pallet (in x-direction), so that the exact position of the pallet 9 can be determined with an accuracy of this difference (L-R) between the scanning S and the overall pallet length L. However this accuracy is sufficient for the present purpose.

The situation according to FIG. 19 is present when the mobile drive 30 drives the pallet 9 in direction of travel D. Now the pallet 9 is moved with a speed v9 identical to the speed v30 of the mobile drive 30. Accordingly the conveyor drive 33 is driven with a circumferential speed v33, which, in the counter direction, is about twice as fast as the speed v30 of mobile drive 30 and the speed v9 of the pallet 9.

The different torque transmissions between the track 24, the mobile drive 30, the rollers 22 and the pallet 9 are subject to slippage. So in reality, driving the conveyor drive 33 with the double speed does not reliably lead to the situation in which the pallet speed v9 is identical to the speed v30 of the mobile drive. So in FIG. 19 due to slippage anywhere between the conveyor drive 33 and the pallet 9, the pallet speed v9 was at least for a certain time slightly smaller than the speed v30 of the mobile drive 30, leading to a misalignment between the mobile drive 30 and the pallet 9. Alternatively a slippage between the wheels 32 of the mobile drive and the track 24 can occur so that the pallet 9 may be faster than the mobile drive 30.

This misalignment can be detected by the scanners 40. As an example the first scanner 40a of the first scanner group 40Ga detects a distance of the distance class d4, meaning that no pallet surface is above the scanner 40. So the scanners can provide distinct indications on a misalignment between the pallet 9 and the mobile drive 30. As a consequence, to reestablish alignment there are at least two alternatives:

1. Adapt (increase/decrease) speed v9 of speed of the mobile drive 30.
  2. Adapt (increase/decrease) speed v33 of speed of conveyor drive 33.

In other words, the signals of the scanners are processed and are the basis for the controlling of the first and/or the second drive motors 32M, 33M.

FIGS. 20 to 25 show an inventive conveyor arrangement 1 in top view in different situations. Here a plurality of conveying sections 11 . . . 19 is provided. Conveying sections 11 . . . 18 are stationary and at least some of them are not connected to each other, meaning that a transfer of a pallet from one stationary conveying section to another stationary conveying section is not possible without further ado.

The conveying section 19 is a mobile conveying section, consequently constituting a transfer car 19 for transferring a pallet 9 and the mobile drive 30 between the stationary conveying sections 11 . . . 18. The transfer car 19 is movable along a transfer track 34. The transfer track 34 defines a transfer direction T which is in particular perpendicular to the direction of travel D of the pallets within the conveyor tracks 11 . . . 19.

Several pallets 9a . . . 9f are located at different positions on the conveying sections.

A particular feature of the present conveying arrangement is, that the arrangement does not require a complex wiring, so nearly all of the required electric and electronic equipment is accommodated within the mobile drive 30. Consequently the arrangement 1 is easy to install and the arrangement 1 can be modified easily. But without complex wiring it not possible to provide an area-wide presence detection along the conveying sections by stationary presence sensors, as it is usual in conventional pallet conveying systems. In order to realize the position detection of pallets 9 and to keep track of the positions, the mobile drive 30 is employed.

Figure 20:
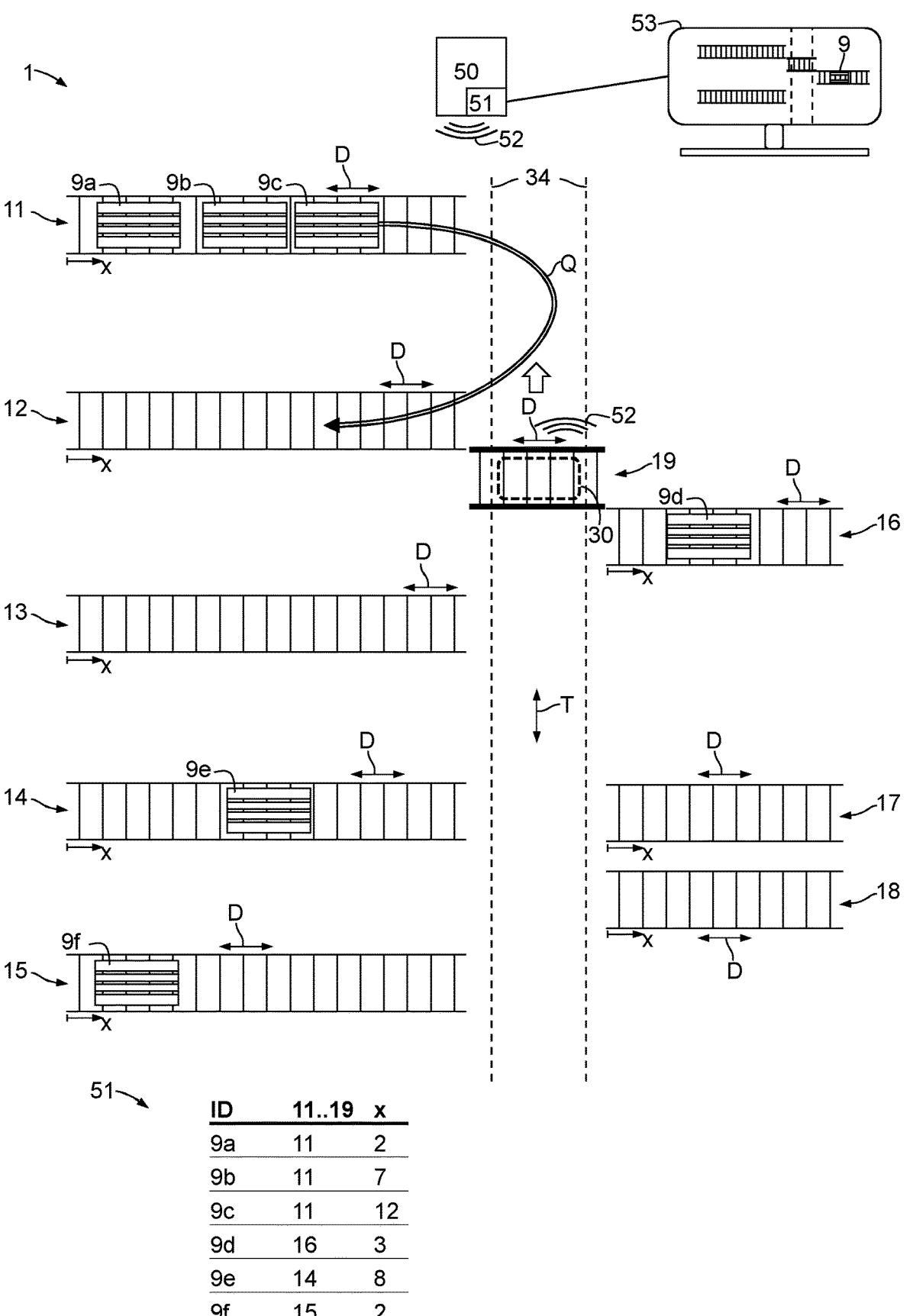
FIG. 20 an inventive conveying arrangement having a plurality of conveying sections in top view in an initial situation of a conveying operation.

In FIG. 20 and the following figures the mobile drive 30 is illustrated with a dashed rectangle, since it is located below the rollers and sometimes at least partially not visible below the pallets 9. The mobile drive 30 uses the scanners 40 disclosed above to detect presence of a pallet 9 in case the pallet is located above the mobile drive 30. In case the scanners 40 of the mobile drive 30 detect a pallet above the mobile drive, the position of pallet is set to the position of the mobile drive 30. The position of the mobile drive 30 is always tracked by a central control unit 50, since the central control unit controls motion of the mobile drive 30.

The central control unit 50 also comprises a position data base 51, in which the positions of detected pallets 9, determined by the mobile drive 30, are stored.

The central control unit 50 and the position data base 51 can be located together in one location or separately. The central control unit 50 or the position data base 51 can be located within the mobile drive 30 or stationary outside of the mobile drive.

A wireless data connection 52 can be established between the mobile drive 30 and the control unit 50.

The tables in FIGS. 20-25 illustrate data, which are stored in the position data base 51. For example, as can be seen correspondingly in the top view and the table, pallet ID 9a is located on the conveying section 11. Parameter x represents exemplarily the actual position of the pallet within the conveying section in direction of travel D. Here exemplarily x=0 represents the most left position; the values x represent in the direction of travel a distance from a Zero position, here the most left position, on the respective conveying section. With these two parameters the position of a pallet 9 within the conveying arrangement 1 is exactly defined. Within the database 51 the positions of all pallets is tracked. Consequently data stored in the position data base constitutes an occupancy status of the conveying arrangement 1.

The conveying arrangement comprises a display 53. The display visualizes at least parts of the conveying arrangement 1 along with the occupancy status. So the display shows a graphical representation of the conveying sections together with a graphical representation of the pallets 9 in a relation which corresponds to the stored positions of the pallets in the position data base 51.

In an exemplary conveying operation a selected pallet 9c is to be moved from a starting position in starting conveying section 11 to final position in a final conveying section 12, as depicted by arrow Q in FIG. 20.

In a first step (FIG. 20) the mobile drive 30 is transferred to the starting conveying section 11 where the selected pallet 9c is located. The transfer is done by means of the transfer car 19. This first step is not applicable if the mobile drive 30 is already located in the correct starting conveying section 11. Afterwards the mobile drive 30 drives along the starting conveying section 11 to the x-position stored in the database 51.

The actual position of the selected pallet 9c may differ from the x-position stored in the database 51. Consequently, the actual position of the selected pallet 9c is now determined by the scanners 40 of the mobile drive 30, although a position of the selected pallet already is stored in the database 51. The determined actual position is used for exact positioning the mobile drive 30 below the selected pallet 9c. If the actual position differs from the stored position, the stored position in the database 51 is updated by the actual position.

Figure 21:
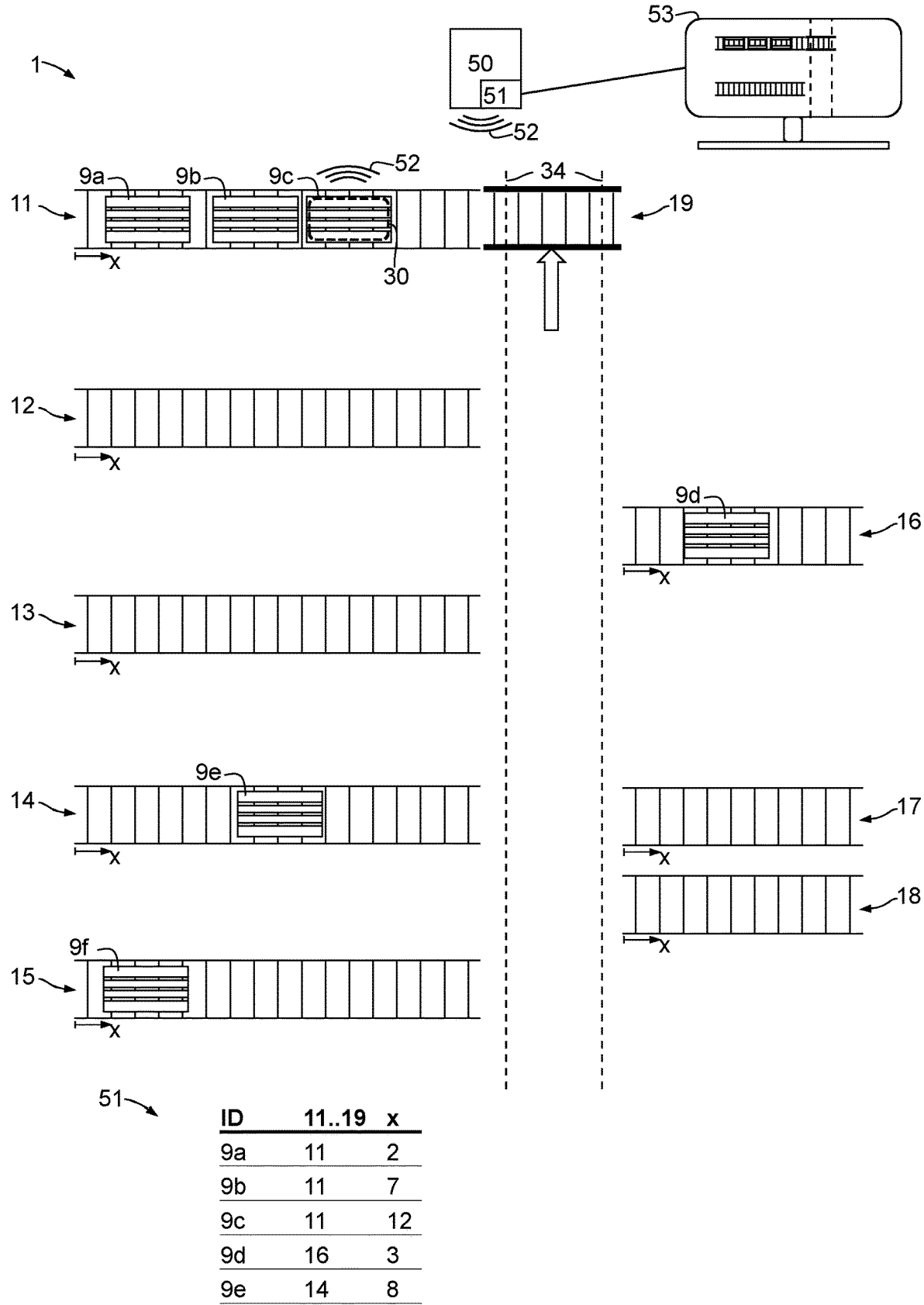
FIGS. 21 and 22 the conveying arrangement of FIG. 20 in intermediate situations of the conveying operation.
Figure 22:
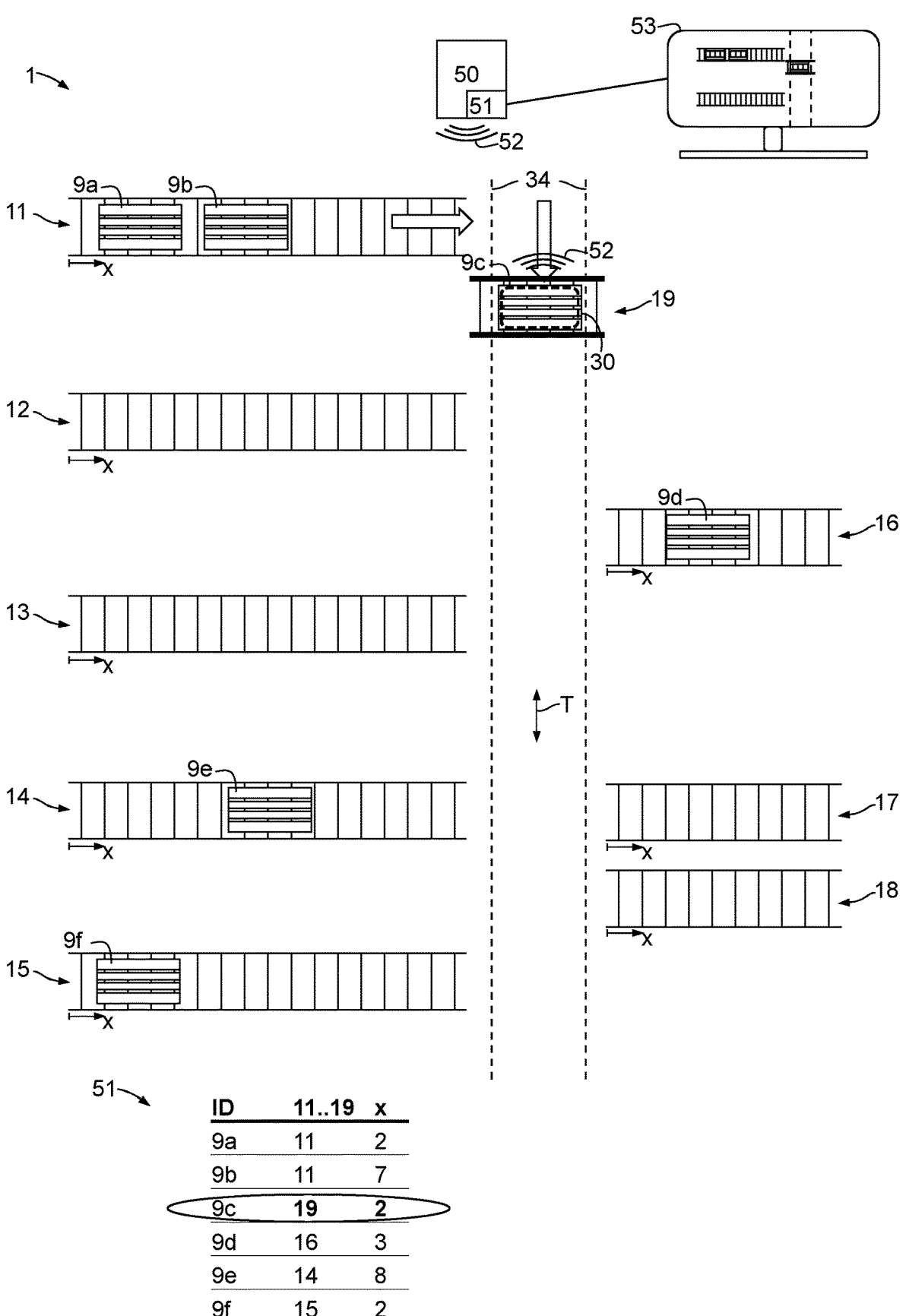
Figure 23:
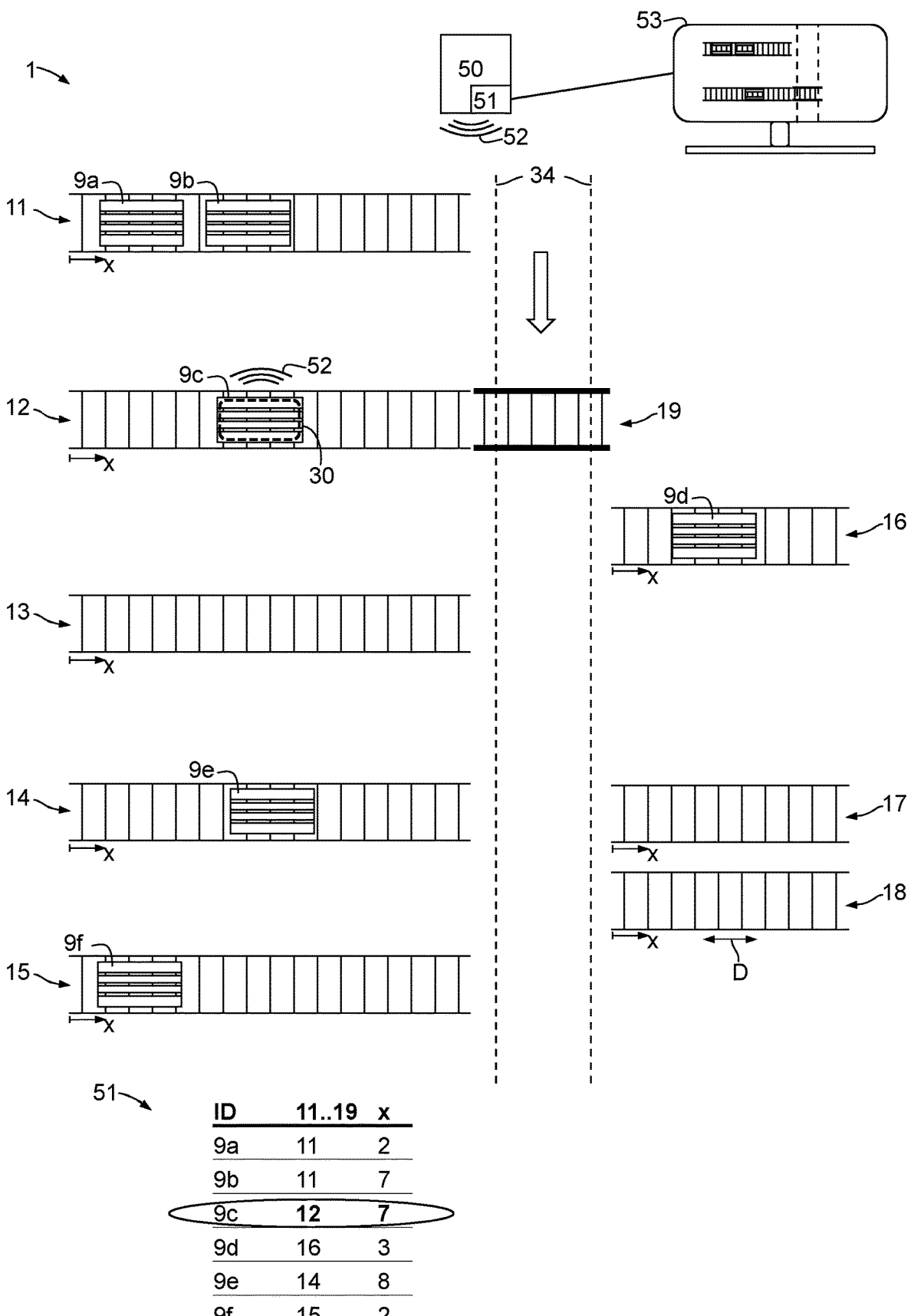
FIG. 23 the conveying arrangement of FIG. 20 in a final situation of the conveying operation.

FIG. 21 shows the situation when the mobile drive 30 is located in the stored position of the selected pallet 9c. Here the stored position conforms to the actual position of the selected pallet 9c, so that the mobile drive can be located exactly below the selected pallet 9 based on the available position information provided by the position data base 51.

When the mobile drive 30 is located below the selected object 9c the mobile drive can drive the selected object 9c. According to FIG. 22 the mobile drive has initially driven the selected pallet 9c along the starting section 11 into the transfer unit 19, where both the mobile drive and the selected pallet 9c are now centrally located. Now the transfer unit 19 starts traveling along the direction of transfer T until the transfer car 19 is aligned with the final conveying section 12, to which the selected pallet 9c is to be delivered. After aligning the transfer unit 19 with the final conveying section 12 the mobile drive 30 drives the selected pallet 9c to its final position within the final conveying section 12.

During the conveying operation the position data stored in the position data base is continuously updated as depicted in the tables by the highlighted values.

Figure 24:
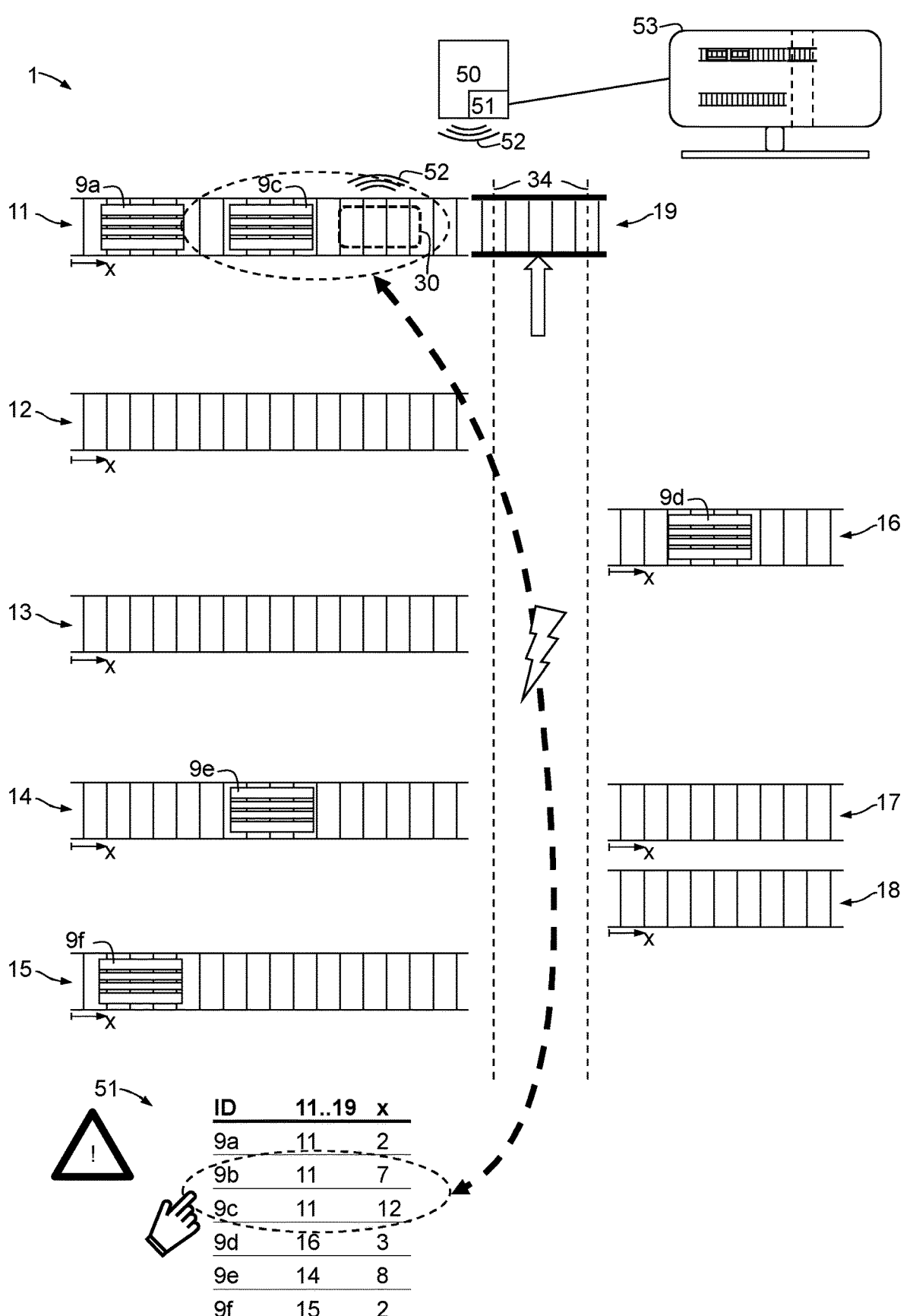
FIG. 24 the conveying arrangement of FIG. 20 in a situation different to FIG. 21.

FIG. 24 shows a situation nearly similar as in FIG. 21. In deviation to FIG. 21 as an example of possible faults, the actual occupancy status does not conform to the occupancy status as stored in the position data base 51. For example the pallet 9b is missing and the selected pallet 9c is located on a different x-position than stored in the database. Here for example the selected pallet 9c is located in a position where, according to the occupancy status, the pallet 9b is expected. Such a situation may occur if a pallet 9b is taken away by a forklift and the pallet 9c is moved manually by an operator.

To avoid any faulty conveying operations also here a validation step is performed, before the mobile drive 30 starts to drive the selected pallet 9c. Therefore the mobile drive 30 drives along the entire starting conveying section 11. By using the scanners 40 the mobile drive can determine the positions of all pallets 9 located in the starting conveying section 11. Based thereon the number of pallets 9 located in the starting section 11a is determined. In the situation of FIG. 21 the result is "3". In the situation of FIG. 24 the result is "2". The occupancy status of the position database also leads to a number of "3" pallets located in the starting conveying section 11. Consequently there is a mismatch between the actual and the occupancy status stored in the position data base. Here the mismatch is a missing pallet in the starting conveying section 11.

If there is a mismatch as shown above between the stored and the actual occupancy status a user input (depicted by the hand symbol) may be requested (depicted by the "!"-sign). Here the user may delete the data relating to pallet 9b. This lead to a situation similar to what is described subsequently with relation to FIG. 25. Also the user can input the correct actual position of the selected pallet 9c to correct the occupancy status in the position data base 51.

Figure 25:
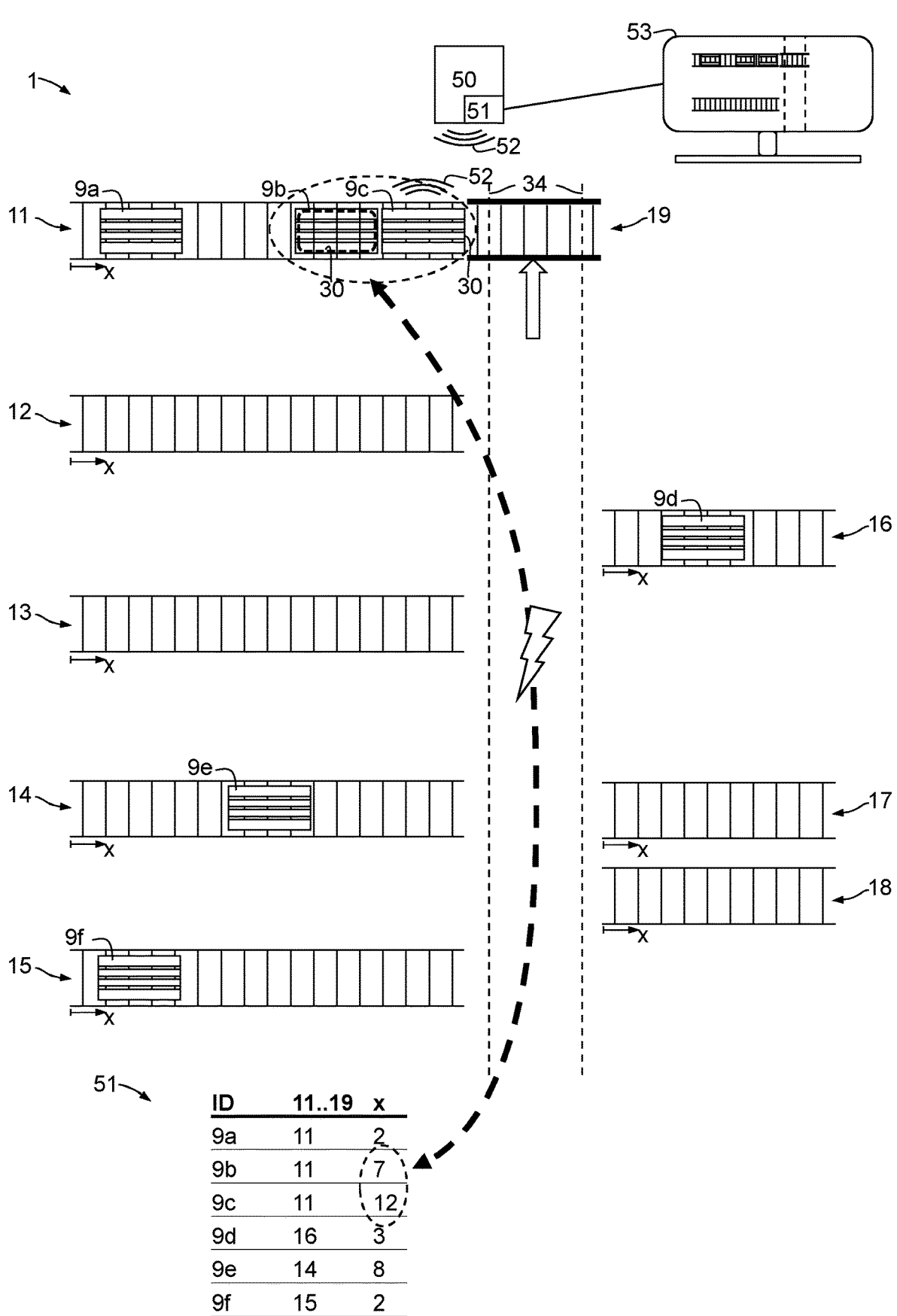
FIG. 25 the conveying arrangement of FIG. 20 in a situation different to FIG. 21.

FIG. 25 shows a situation nearly similar as in FIG. 21. In deviation to FIG. 21 as an example of possible deviations, the actual occupancy status does not conform to the occupancy status as stored in the position data base 51. For example the pallet 9b is actually located on the stored position of pallet 9 and the selected pallet 9c is located more rightwards than stored in the database. So consequently when merely following the stored data, the mobile drive 30 would be positioned below pallet 9b instead of below selected pallet 9c and would drive the (wrong) pallet 9b instead of the (correct) selected pallet 9c. That would lead to a big mess.

To avoid any faulty conveying operations a validation step is performed, before the mobile drive 30 starts to drive the selected pallet 9c. Therefore the mobile drive 30 drives along the entire starting conveying section 11. By using the scanners 40 the mobile drive can determine the positions of all pallets 9 located on the starting conveying section 11. Based thereon the number of pallets located in the starting section 11 is counted. In the situation of FIGS. 21 and 25 the result is the same, "3". The occupancy status of the position database leads to a number of 3 pallets located in the starting conveying section 11. Consequently there is no mismatch between the actual and the stored occupancy status in view of the total amount of pallets 9 located in the starting conveying section 11. Merely the stored positions are not exact.

The positions may vary during the time, since person may shift the pallets manually along a conveying section. But as long as the total number of pallets determined on the conveying section conforms to the total number of pallets according to the position storage, it is assumed that the same pallets are actually located on the conveying section in the same sequence as listed in the position data base 51. So any deviations in merely the exact position data can be cleared out automatically by the system based on the position data determined with the help of the mobile drive 30.

Figure 26:
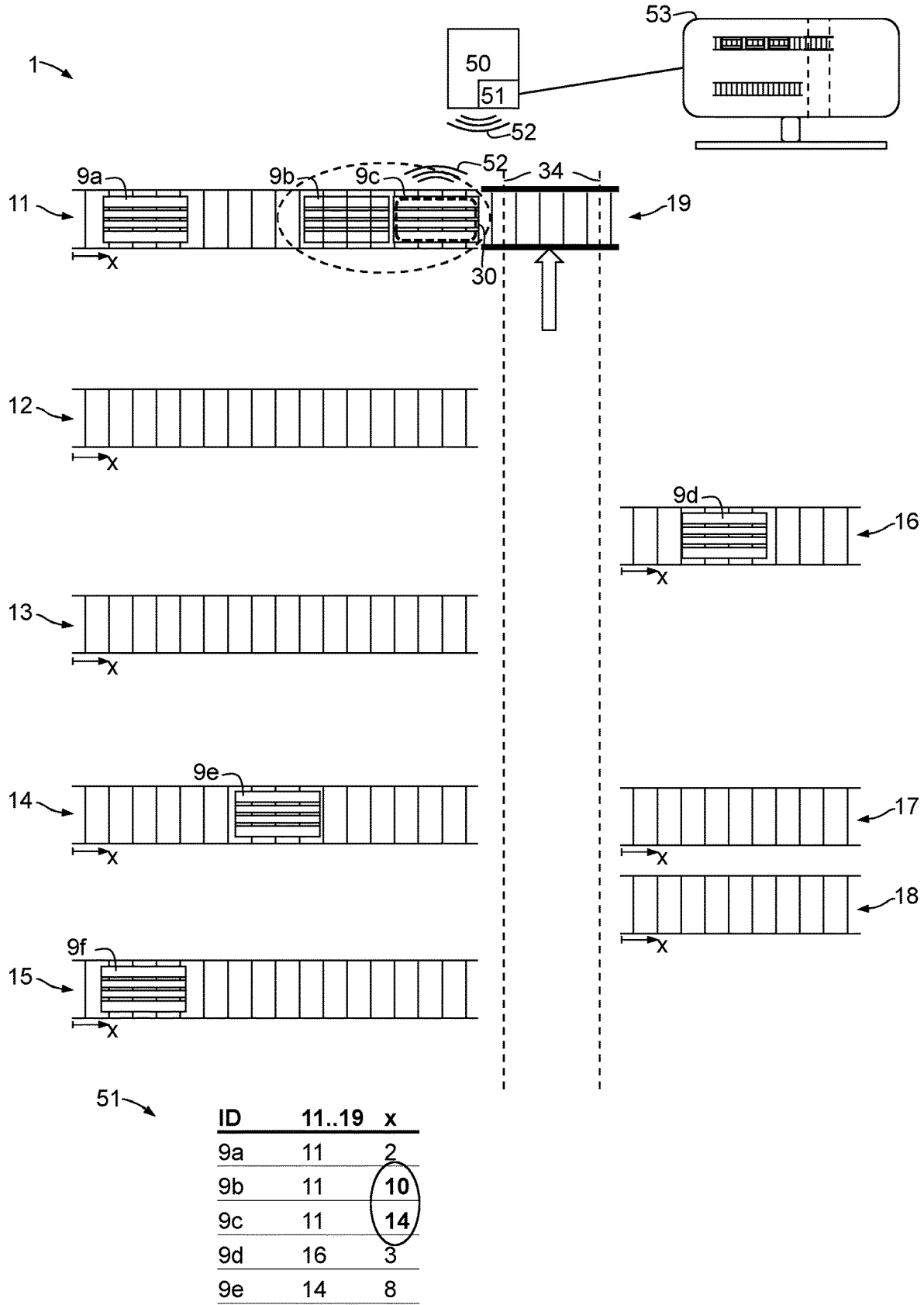
FIG. 26 the conveying arrangement of FIG. 25 in with corrected position data.

As a consequence in the next step (FIG. 26) merely the x-positions are updated in the position data base after the validation step came to the conclusion that the actual number of pallets conform to the stored number of pallets in the starting conveying section. Afterwards, during the conveying operation the selected pallet is transported as usual whereby the mobile drive starts driving the selected pallet 9c in the actual and stored position of the selected pallet 9c.

LIST OF REFERENCE SIGNS 1 conveyor arrangement
8 floor
9 object to be conveyed (pallet)
9M simplified digital surface model of object to be conveyed (pallet model)
11 . . . 18 conveying section (stationary)
19 conveying section (movable)/transfer car
21 frame
22 rollers
24 track
30 mobile drive
31 main body
32 wheels
32M first drive motor
33 conveyor drive
33M second drive motor
34 transfer track
40 scanner
40G scanner group
50 central control unit
51 position data base
52 (wireless) data connection
53 operator display
91 upper longitudinal member
91G longitudinal gaps between upper longitudinal members
92 lower longitudinal member
93 cross member
93G cross gaps between cross members
94 distance block
95 crack
Q arrow
L length of pallet in direction of travel
S scanning range of scanner in direction of travel
D direction of travel
T direction of transfer
R orientation of roller
F field of view
tv top view
sv side view
fv frontal view
d1, d2, d3 distance class
v9 speed of pallet
v33 circumferential speed of conveyor drive
v30 speed of mobile drive
The invention claimed is:
1. A conveyor arrangement (1), comprising:
a conveying section (11) having a plurality of rollers (22) on which a conveyable object (9), in particular a pallet, can be conveyed;

a mobile drive (30), wherein the mobile drive is movable along different positions along the conveying section (11) and the mobile drive is adapted to temporarily provide a drive power to a selected roller (22) depending on the position of the mobile drive (30) in particular by immediate contact between the mobile drive and the roller (22) wherein the mobile drive (30) comprises scanners (40) to detect a presence of an conveyable object (9) located above the rollers (22), further wherein at least one scanner (40) is located below the roller (22) and is adapted to detect a conveyable object (9) located above the mobile drive and above on the rollers (22);

a position database (51) adapted to store positions of the conveyable objects (9) located in the conveyor arrangement (1), wherein the conveyor arrangement (1) is adapted to store a position of the objects located in the conveyor arrangement obtained by the scanners (40);

wherein the conveyor arrangement (1) is adapted to use the stored position in a manner to control movement of the mobile device (30) in a later conveying operation of the object linked to the stored position; and wherein in the later conveying operation, the mobile drive (30) is directed from a position distant from the object in a direction towards the stored position of the object.

2. The conveyor arrangement (1) according to claim 1, further comprising a position database (51) adapted to store positions of the conveyable objects (9) located in the conveyor arrangement (1).

3. The conveyor arrangement (1) according to claim 1, wherein the scanner has a field of view (F) which is oriented in top view parallel to an orientation of the roller (22), in particular the orientation of the roller conforms to an axis of rotation of the roller, and/or wherein the field of view (F) is oriented in frontal view angled to a horizontal plane in an acute angle.

4. The conveyor arrangement (1) according to claim 1, wherein the scanner is adapted to scan said conveyable object (9):

in top view, in a direction parallel to an axis of ration, and in frontal view at an acute angle compared to a horizontal plane.

5. A conveyor arrangement (1) according to claim 1, wherein the conveyor arrangement is adapted to determine the presence of a conveyable object (9) above the roller (22) from below the roller by analyzing a plurality of distances to surfaces of items above mobile drive, and wherein the distances are obtained by at least one of the scanners.

6. A method for operating a conveyor arrangement (1), comprising:

providing a conveyor arrangement, comprising:

a conveying section (11) having a plurality of rollers (22) on which a conveyable object (9), in particular a pallet, can be conveyed, a mobile drive (30), wherein the mobile drive is movable along different positions along the conveying section (11) and the mobile drive is adapted to temporarily provide a drive power to a selected roller (22) depending on the position of the mobile drive (30) in particular by immediate contact between the mobile drive and the roller (22), wherein the mobile drive (30) comprises scanners (40) to detect a presence of an conveyable object (9) located above the rollers (22);

transporting a selected object (9c) from a starting position to a final position within the conveying arrangement (1) by a transport operation comprising the following steps:

moving the mobile drive (30) to a stored position of said selected object (9c), wherein the stored position is stored in a database (51); and when moving the mobile drive, using the scanners (40) to determine the actual position of said selected object (9c) and positioning the mobile drive (30) below said selected object (9c) based on the determined actual position of said selected object (9c).

7. The method according to claim 6, characterized in, that the positions of a plurality of conveyable objects (9) located along the conveying sections are tracked, in particular stored, in a position data base (51), and wherein a stored position is used to guide the mobile drive at a later conveying step to a selected conveyable object.

8. The method according to claim 6, further comprising:

determining an actual position of any of said conveyable objects (9) by:

positioning the mobile drive (30) below the conveyable object (9);

defining the position of the mobile drive (30) based on the position of the mobile drive, optionally under consideration of an offset value.

9. The method according to claim 6, wherein in regular intervals and/or upon a user request an inventory is conducted, further wherein during conducting the inventory the occupancy status of at least sections (11) of the conveying arrangement (19) tracked in the position database is set and/or updated;

wherein conducting the inventory comprises the following steps:

driving the mobile drive (3) along all of said at least sections (11), thereby determining the position of conveyable objects (9) located above the roller (22);

defining the position of the mobile drive (30) based on the position of the mobile drive, optionally under consideration of an offset value; and setting or updating the defined position in the position data base (51).

10. The method according to claim 6, wherein a position of an conveyable object (9) within the conveying arrangement (1) is defined by a unique identifier of a conveying section (11 . . . 19) on which the conveyable object (9) is located; and a unique position value indicating the position within the conveying section.

11. The method according to claim 6, wherein the transport operation comprises a verifying step in which the position of selected pallet (9c) is verified, in particular wherein the verifying step comprises the steps:

determining the actual number of conveyable objects (9) located within the starting section (11), in particular by counting the objects within said starting section (11), thereby using the scanners (40) of the mobile drive (30) to detect the presence of all conveyable objects (9) within the total extension of said conveying section (11);

determining a stored number of conveyable objects (9) located within said conveying section (11) based on the position data stored in the position data base (51), comparing the determined actual number and the determined stored number;

in particular:

wherein a verifying result is positive in case the determined actual number and the determined stored number are equal, wherein a verifying result is negative in case the determined actual number and the determined stored number are not equal;

in particular for determining the actual number of conveyable objects (9) on the starting conveying section (11) the mobile drive (30) essentially drives along the entire extension of said starting conveying section (11);

in particular wherein in case that the verifying step delivers the result, that the number of conveyable objects (9) actually located in said conveying section (11) corresponds to the occupancy status stored in the position data base (51), but the positions of the conveyable objects (9) within said conveying section (11) does not correspond to the occupancy status stored in the position data base (51), the positions of the conveyable objects (9) stored in the position data (51) base are updated by the actual positions obtained during the verification step by means of the sensors.

12. The method according to claim 6, wherein for detecting the presence of an object and/or a position of said object the scanner sans an area above the rollers:

in top view, in a direction parallel to an axis of ration of the rollers, and in frontal view, in a direction at an acute angle compared to a horizontal plane.

\* \* \* \* \*